(12) United States Patent
Hu et al.

(10) Patent No.: US 10,943,020 B2
(45) Date of Patent: Mar. 9, 2021

(54) DATA COMMUNICATION SYSTEM WITH HIERARCHICAL BUS ENCRYPTION SYSTEM

(71) Applicant: HUAWEI TECHNOLOGIES CO., LTD., Shenzhen (CN)

(72) Inventors: Cui Hu, Shanghai (CN); ZhuFeng Tan, Shanghai (CN); Shaojie Sun, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 16/111,228

(22) Filed: Aug. 24, 2018

(65) Prior Publication Data

US 2019/0012472 A1  Jan. 10, 2019

Related U.S. Application Data

(63) Continuation of application No. PCT/CN2016/096288, filed on Aug. 22, 2016.

(30) Foreign Application Priority Data

Feb. 26, 2016 (CN) .......................... 201610109754.X

(51) Int. Cl.
*G06F 21/60* (2013.01)
*H04L 9/12* (2006.01)
(Continued)

(52) U.S. Cl.
CPC .......... *G06F 21/606* (2013.01); *G06F 21/602* (2013.01); *G06F 21/85* (2013.01); *G06Q 20/3227* (2013.01); *G07F 7/084* (2013.01); *H04L 9/06* (2013.01); *H04L 9/0662* (2013.01); *H04L 9/0869* (2013.01); *H04L 9/12* (2013.01); *G06Q 2220/00* (2013.01)

(58) Field of Classification Search
CPC ....... G06F 21/80; G06F 21/72; H04N 7/1675; H04L 9/3268
USPC ........................................................ 726/15
See application file for complete search history.

(56) References Cited

U.S. PATENT DOCUMENTS

| 5,638,448 A | * | 6/1997 | Nguyen | ................. H04L 29/06 380/29 |
| 6,378,072 B1 | * | 4/2002 | Collins | ................. G06F 21/572 713/161 |

(Continued)

FOREIGN PATENT DOCUMENTS

| CN | 101299228 A | 11/2008 |
| CN | 101533438 A | 9/2009 |

(Continued)

*Primary Examiner* — Bryan F Wright
(74) *Attorney, Agent, or Firm* — Hauptman Ham, LLP

(57) ABSTRACT

A system includes at least two buses including a first bus and a second bus, an encryption and decryption system corresponding to each bus, at least one signal processing module corresponding to each bus, and a bus converter coupled between the first bus and the second bus. According to the system provided in embodiments of the present invention, because data transmitted on a bus is encrypted data, even though an attacker obtains bus data by means of a probe attack, it is quite difficult to break a key, and an anti-attack capability of the system can be improved.

20 Claims, 5 Drawing Sheets

(51) Int. Cl.
*H04L 9/06* (2006.01)
*G06F 21/85* (2013.01)
*G07F 7/08* (2006.01)
*G06Q 20/32* (2012.01)
*H04L 9/08* (2006.01)

(56) References Cited

U.S. PATENT DOCUMENTS

| | | | |
|---|---|---|---|
| 6,928,164 B1* | 8/2005 | Ully | G06F 7/00 380/44 |
| 7,082,539 B1* | 7/2006 | Kitahara | G06F 21/71 713/189 |
| 8,826,039 B2* | 9/2014 | Chou | G06F 21/72 713/193 |
| 2002/0150248 A1* | 10/2002 | Kovacevic | H04N 7/1675 380/210 |
| 2002/0174351 A1* | 11/2002 | Jeong | G06F 21/85 713/189 |
| 2003/0048900 A1* | 3/2003 | Kim | G06F 21/79 380/229 |
| 2007/0223688 A1* | 9/2007 | Le Quere | G06F 21/72 380/28 |
| 2009/0292847 A1 | 11/2009 | Henry et al. | |
| 2013/0191649 A1 | 7/2013 | Muff et al. | |
| 2014/0315485 A1* | 10/2014 | Marie | H04L 63/0428 455/41.1 |
| 2015/0371063 A1* | 12/2015 | Van Antwerpen | G06F 21/80 713/190 |
| 2016/0117506 A1 | 4/2016 | Buer et al. | |
| 2018/0060608 A1* | 3/2018 | Holden | H04L 9/3268 |

FOREIGN PATENT DOCUMENTS

| | | |
|---|---|---|
| CN | 103078775 A | 5/2013 |
| CN | 103218572 A | 7/2013 |
| CN | 103377349 A | 10/2013 |
| CN | 10421104 A | 9/2014 |
| CN | 105323249 A | 2/2016 |
| CN | 105790927 A | 7/2016 |
| EP | 2428910 A2 | 3/2012 |

\* cited by examiner

DATA COMMUNICATION SYSTEM WITH HIERARCHICAL BUS ENCRYPTION SYSTEM

CROSS-REFERENCE TO RELATED APPLICATIONS

This application is a continuation of International Application No. PCT/CN2016/096288, filed on Aug. 22, 2016, which claims priority to Chinese Patent Application No. 201610109754.X, filed on Feb. 26, 2016, The disclosures of the aforementioned applications are hereby incorporated by reference in their entireties.

TECHNICAL FIELD

The present invention relates to the field of system security technologies, and in particular, to a hierarchical bus encryption system.

BACKGROUND

The increasingly rapid development of the mobile payment field poses an increasingly high security requirement on an embedded security element (eSE). Two eSE system models provided in the prior art cannot ensure good eSE transmission security.

Specifically, in a conventional solution 1 shown in FIG. 1, all modules are attached to a same high-performance bus, that is, a Advanced High-performance Bus (AHB). These modules include a security module, such as a cryptographic algorithm unit and a storage unit, and a common module, such as an interface unit and a watchdog unit. Data transmission of the security module is not physically isolated from that of the common module.

In most conventional solutions, data transmitted on a bus is not encrypted for protection. Consequently, confidential data in the data may be obtained by an attacker, and security is not high. Specifically, when using a probe to perform an attack, the attacker may obtain data transmitted on the AHB and obtain a key by analyzing the obtained data. If the data transmitted on the bus is encrypted for protection, non-confidential data of the common module is encrypted together. In this case, product performance is affected.

It can be learned from the foregoing that, in the solution shown in FIG. 1, all modules are attached to one AHB, and the data transmission of the security module is not physically isolated from that of the common module. Therefore, load of the bus is heavy, system processing efficiency is affected, and the bus is not fully and appropriately used according to security of the modules.

In a conventional solution 2 shown in FIG. 2, a two-level bus solution is proposed, so as to fully use a bus system provided by a central processing unit. Specifically, two-level buses, namely an AHB and an advanced peripheral bus (APB), are used, and modules are classified. The classification is usually based on requirements of the modules on a data transmission rate. A module with a high rate requirement is attached to the AHB, and a module with a low rate requirement is attached to the APB bus. However, in this solution, a security module is still not differentiated from a common module in terms of a security requirement, and transmitted data is not encrypted.

Therefore, similar to the solution in FIG. 1, in the two-level bus solution, if the transmitted data is not encrypted for protection, an attacker may also obtain a key by means of analysis. If the data transmitted on the bus is encrypted for protection, non-confidential data of the common module is encrypted together. Consequently, product performance is affected. Likewise, data transmission of the security module is not physically isolated from that of the common module, and a difference lies only in a data transmission rate requirement. Therefore, the bus is not fully and appropriately used according to security of the modules.

SUMMARY

An objective of embodiments of the present invention is to provide a hierarchical bus encryption system, to resolve problems that data transmission of a security module is not physically isolated from that of a common module and that a bus is not fully and appropriately used according to security of the modules.

The objective of the embodiment of the present invention is implemented by using the following technical solutions:

According to a first aspect, a hierarchical bus encryption system includes at least two buses including a first bus and a second bus, an encryption and decryption system corresponding to each bus, at least one signal processing module corresponding to each bus, and a bus converter coupled between the first bus and the second bus, where a first signal processing module corresponding to the first bus is configured to perform data communication with a second signal processing module corresponding to the second bus through the first bus, the bus converter, and the second bus;

a first encryption and decryption system corresponding to the first bus is configured to perform encryption processing on first data transmitted on the first bus based on a first encryption algorithm;

a second encryption and decryption system corresponding to the second bus is configured to perform encryption processing on second data transmitted on the second bus based on a second encryption algorithm;

the bus converter is configured to serve as an interface between the first data and the second data, to adapt to the first bus and the second bus; and the first encryption algorithm is corresponding to a first security level, the second encryption algorithm is corresponding to a second security level, and the first security level is different from the second security level.

With reference to the first aspect, in a first possible implementation, the first encryption and decryption system includes:

a first encryption and decryption unit, coupled to the first signal processing module, and configured to: when receiving the first data that includes a first plaintext and that is sent by the first signal processing module to the second signal processing module, encrypt the first data including the first plaintext based on the first encryption algorithm, to obtain the first data including a first ciphertext, and forward the first data including the first ciphertext to the bus converter through the first bus.

With reference to the first aspect or the first possible implementation of the first aspect, in a second possible implementation, the second encryption and decryption system includes:

a second encryption and decryption unit, coupled to the bus converter, and configured to: receive the second data that includes the first ciphertext and that is obtained by the bus converter converting the first data including the first ciphertext, encrypt the second data including the first ciphertext based on the second encryption algorithm, and decrypt the second data including the first ciphertext based on a first decryption algorithm, to obtain the second data including a second ciphertext, and transmit the second data including the second ciphertext on the second bus; and a third encryption and decryption unit, coupled to the second signal processing module, and configured to: receive the second data including the second ciphertext from the second bus, and decrypt the second data including the second ciphertext based on a second decryption algorithm, to obtain the second data that includes the first plaintext and that is required by the second signal processing module; where the first decryption algorithm matches the first encryption algorithm, and the second decryption algorithm matches the second encryption algorithm.

With reference to the first aspect or any possible implementation of the first aspect, in a third possible implementation, the second encryption and decryption system includes:

a second encryption and decryption unit, coupled to the bus converter, and configured to: receive the second data that includes the first ciphertext and that is obtained by the bus converter converting the first data including the first ciphertext, encrypt the second data including the first ciphertext based on the second encryption algorithm, to obtain the second data including a third ciphertext, and transmit the second data including the third ciphertext on the second bus; and a third encryption and decryption unit, coupled to the second signal processing module, and configured to: receive the second data including the third ciphertext from the second bus, and decrypt the second data including the third ciphertext based on a first decryption algorithm and a second decryption algorithm, to obtain the second data that includes the first plaintext and that is required by the second signal processing module; where the first decryption algorithm matches the first encryption algorithm, and the second decryption algorithm matches the second encryption algorithm.

With reference to the first aspect or any possible implementation of the first aspect, in a fourth possible implementation, the bus converter includes an encryption and decryption conversion unit, configured to: obtain the second data including the first ciphertext by converting the first data including the first ciphertext, encrypt the second data including the first ciphertext based on the second encryption algorithm, and decrypt the second data including the first ciphertext based on a first decryption algorithm, to obtain the second data including a second ciphertext, and transmit the second data including the second ciphertext on the second bus; and the second encryption and decryption system includes:

a third encryption and decryption unit, coupled to the second signal processing module, and configured to: receive the second data including the second ciphertext from the second bus, and decrypt the second data including the second ciphertext based on a second decryption algorithm, to obtain the second data that includes the first plaintext and that is required by the second signal processing module; where the first decryption algorithm matches the first encryption algorithm, and the second decryption algorithm matches the second encryption algorithm.

With reference to the first aspect or any possible implementation of the first aspect, in a fifth possible implementation, the first encryption and decryption system further includes a fourth encryption and decryption unit;

the first encryption and decryption unit is further configured to: when receiving the first data that includes a second plaintext and that is sent by the first signal processing module to a third signal processing module corresponding to the first bus, encrypt the first data including the second plaintext based on the first encryption algorithm, to obtain the first data including a fourth ciphertext, and forward the first data including the fourth ciphertext to the fourth encryption and decryption unit through the first bus; and the fourth encryption and decryption unit is configured to decrypt the first data including the fourth ciphertext based on the first decryption algorithm, to obtain the first data that includes the second plaintext and that is required by the third signal processing module, where the first decryption algorithm matches the first encryption algorithm.

With reference to the first aspect or any possible implementation of the first aspect, in a sixth possible implementation, the system further includes at least one random number generator, configured to generate at least one key of a cryptographic algorithm set of encryption or decryption used by each encryption and decryption system and each encryption and decryption conversion unit.

With reference to the first aspect or any possible implementation of the first aspect, in a seventh possible implementation, at least one of the first bus or the second bus is at least one bus of a high-performance bus AHB, an advanced peripheral bus APB, or an advanced system bus ASB.

With reference to the first aspect or any possible implementation of the first aspect, in an eighth possible implementation, the at least one signal processing module corresponding to each bus includes at least one of: a signal processing unit, a storage unit, a random number generator, a cryptographic algorithm unit, an interface unit, a clock unit, or a watchdog unit.

With reference to the first aspect or any possible implementation of the first aspect, in a ninth possible implementation, the system is applied to a mobile payment field.

According to a second aspect, a hierarchical bus encryption method includes:

using a first encryption and decryption unit to encrypt first data that includes a first plaintext and that is transmitted on a first bus based on the first encryption algorithm, to obtain the first data including a first ciphertext;

forwarding the first data including the first ciphertext to the bus converter through the first bus;

converting, by using the bus converter, the first data including the first ciphertext into second data that includes the first ciphertext and that can be transmitted on a second bus;

by using a second encryption and decryption unit, encrypting the second data including the first ciphertext based on the second encryption algorithm, and decrypting the second data including the first ciphertext based on a first decryption algorithm, to obtain the second data including a second ciphertext;

forwarding the second data including the second ciphertext to a third encryption and decryption unit through the second bus; and decrypting, by using the third encryption and decryption unit, the second data including the second ciphertext based on a second decryption algorithm, to obtain the second data including the first plaintext.

According to a third aspect, a hierarchical bus encryption method includes:

using a first encryption and decryption unit to encrypt first data that includes a first plaintext and that is transmitted on a first bus based on the first encryption algorithm, to obtain the first data including a first ciphertext;

forwarding the first data including the first ciphertext to the bus converter through the first bus;

converting, by using the bus converter, the first data including the first ciphertext into second data that includes the first ciphertext and that can be transmitted on a second bus;

encrypting, by using a second encryption and decryption unit, the second data including the first ciphertext based on the second encryption algorithm, to obtain the second data including a third ciphertext;

forwarding the second data including the third ciphertext to a third encryption and decryption unit through the second bus; and decrypting, by using the third encryption and decryption unit, the second data including the third ciphertext based on a first decryption algorithm and a second decryption algorithm, to obtain the second data including the first plaintext.

In some embodiments, in the second aspect or the third aspect, at least one of the first bus or the second bus is at least one bus of a high-performance bus AHB, an advanced peripheral bus APB, or an advanced system bus ASB.

The hierarchical bus encryption system in the embodiments of the present invention includes the at least two buses including the first bus and the second bus, the encryption and decryption system corresponding to each bus, the at least one signal processing module corresponding to each bus, and the bus converter coupled between the first bus and the second bus. According to the system provided in the embodiments of the present invention, specific encryption is performed for each module that needs to transmit data on a bus, thereby ensuring high security of some modules, and ensuring high speeds of some modules. The modules are separately attached to buses at different levels according to security. This physically isolates secure data from common data. Because data transmitted on a bus is encrypted data, even though an attacker obtains bus data by means of a probe attack, it is quite difficult to break a key. Therefore, an anti-attack capability of the system can be improved.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The embodiments of the present invention provide a hierarchical bus encryption system, to resolve problems that data transmission of a security module is not physically isolated from that of a common module and that a bus is not fully and appropriately used according to security of the modules.

A method and an apparatus are based on a same inventive concept. Because the method and the apparatus have similar principles to resolve a problem, implementation of the apparatus and implementation of the method may reference each other, and details are not repeated.

The following describes some embodiments of the present invention in detail with reference to the accompanying drawings.

Figure 1:
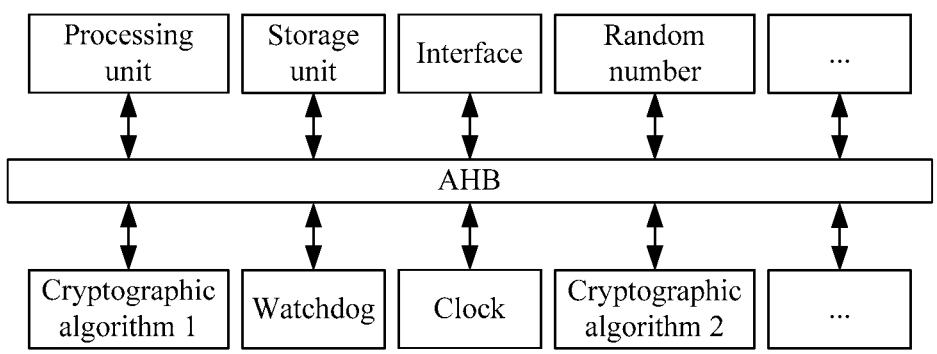
FIG. 1 is a schematic diagram of a connection relationship between a bus and a module according to the background of the present invention.
Figure 2:
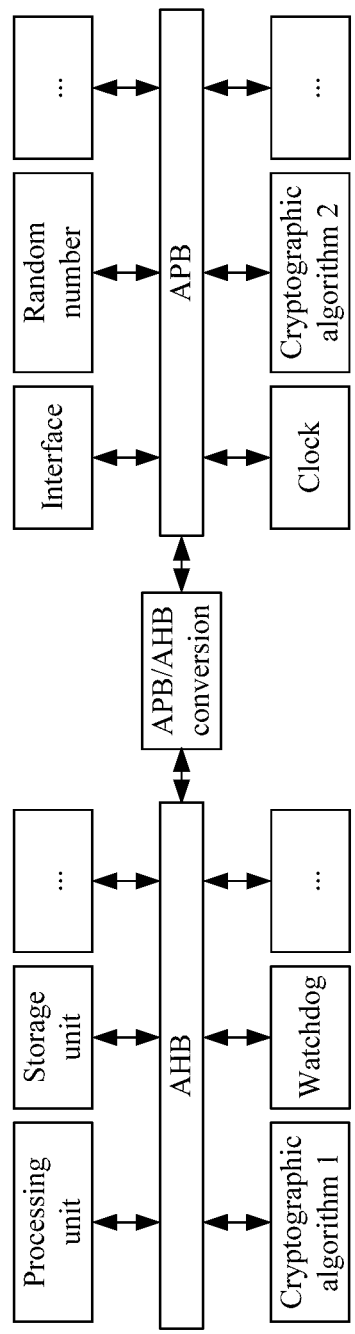
FIG. 2 is a schematic diagram of a connection relationship between a bus and a module in a two-level bus solution according to the background of the present invention.
Figure 3:
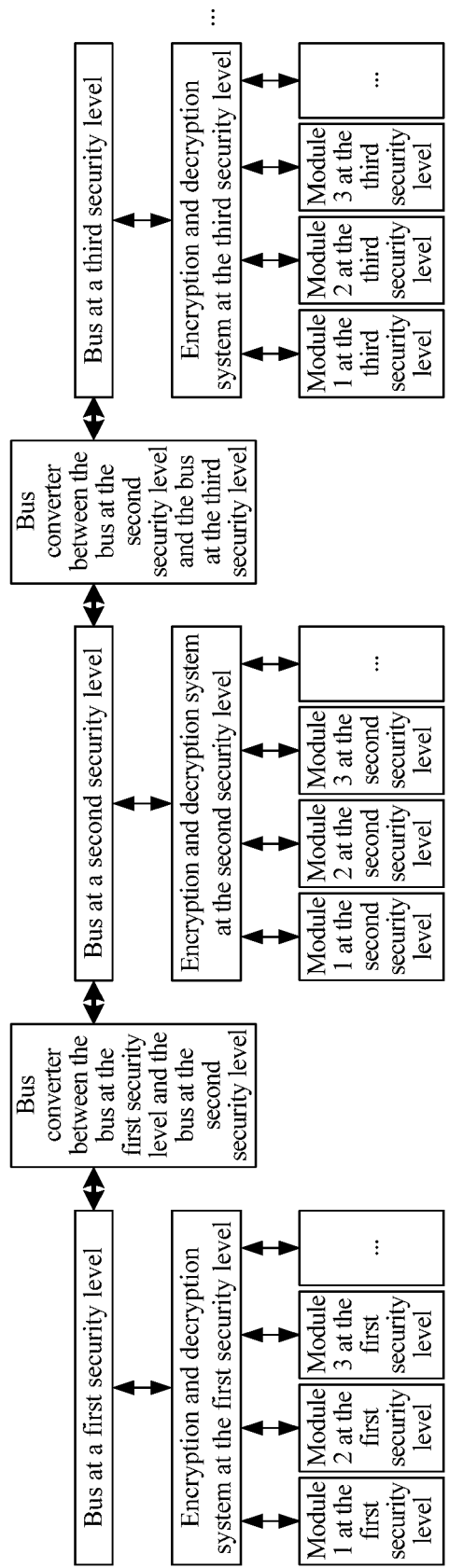
FIG. 3 is a schematic structural diagram of a hierarchical bus encryption system according to an embodiment of the present invention.

Referring to FIG. 3, an embodiment of the present invention provides a hierarchical bus encryption system, including at least two buses including a first bus and a second bus, an encryption and decryption system corresponding to each bus, at least one signal processing module corresponding to each bus, and a bus converter coupled between the first bus and the second bus.

At least one of the first bus or the second bus is at least one bus of an AHB, an APB, or an advanced system bus (ASB). A bus combination in the hierarchical bus encryption system may be AHB+APB, ASB+APB, AHB+APB1+APB2, ASB+APB1+APB2, or the like.

The at least one signal processing module corresponding to each bus includes at least one of: a signal processing unit, a storage unit, a random number generator, a cryptographic algorithm unit, an interface unit, a clock unit, or a watchdog unit.

A first signal processing module corresponding to the first bus is configured to perform data communication with a second signal processing module corresponding to the second bus through the first bus, the bus converter, and the second bus.

A preset security level is preset for each signal processing module. Signal processing modules at different security levels are attached to buses at corresponding security levels. Therefore, the first bus has a same security level as the first signal processing module. The second bus has a same security level as the second signal processing module.

For example, signal processing modules are set to a first security level, a second security level, and a third security level according to a security and confidentiality requirement. Correspondingly, buses are set to the first security level, the second security level, and the third security level.

For another example, signal processing modules are classified into two security levels, that is, a high-level module and a common module. Two buses are also corresponding to two security levels, that is, a high-level bus and a common bus.

For another example, signal processing modules in an eSE are classified into two types according to security of the signal processing modules, that is, a high-security module and a low-security module. The AHB is a high-security bus, and the APB is a low-security module. High-security modules, such as the signal processing unit, the storage unit, the random number generation unit, and the cryptographic algorithm unit, are attached to the AHB, and low-security modules, such as the interface unit, the clock unit, and the watchdog unit, are attached to the APB.

A first encryption and decryption system corresponding to the first bus is configured to perform encryption processing on first data transmitted on the first bus based on a first encryption algorithm.

Data transmitted on the first bus is collectively referred to as the first data.

The first encryption and decryption system includes:

a first encryption and decryption unit, coupled to the first signal processing module, and configured to: when receiving the first data that includes a first plaintext and that is sent by the first signal processing module to the second signal processing module, encrypt the first data including the first plaintext based on the first encryption algorithm, to obtain first data including a first ciphertext, and forward the first data including the first ciphertext to the bus converter through the first bus.

Specifically, in actual application, before the first signal processing module encrypts, by using the first encryption and decryption unit, the first data that includes the first plaintext and that needs to be transmitted, the first signal processing module needs to obtain a bus resource of the first bus. In some embodiments, a manner of obtaining a bus resource of the first bus by the first module may include, but is not limited to, the following two manners:

First manner: The first signal processing module sends a transmission request to a central processing unit (CPU), and the first signal processing module receives a bus resource, allocated by the CPU, of the first bus.

Second manner: The first signal processing module sends a transmission request to direct memory access (DMA) device, and the first signal processing module receives a bus resource, allocated by the DMA device, of the first bus.

In some embodiments, before the first signal processing module encrypts, by using the first encryption and decryption unit, data that needs to be transmitted, the first signal processing module receives an encryption control instruction sent by preset hardware or preset software. The encryption control instruction is used to instruct the first signal processing module to send, to the first encryption and decryption unit, the first data including the first plaintext for encryption. The preset hardware herein may be the CPU or the DMA device.

A second encryption and decryption system corresponding to the second bus is configured to perform encryption processing on second data transmitted on the second bus based on a second encryption algorithm.

Data transmitted on the second bus is collectively referred to as the second data.

The first encryption algorithm herein is corresponding to the first security level, the second encryption algorithm is corresponding to the second security level, and the first security level is different from the second security level.

That is, the first bus has a same security level as the first signal processing module, the first encryption and decryption system, and the first encryption algorithm; the second bus has a same security level as the second signal processing module, the second encryption and decryption system, and the second encryption algorithm.

The second encryption and decryption system includes a second encryption and decryption unit and a third encryption and decryption unit. The second encryption and decryption unit and the third encryption and decryption unit in the second encryption and decryption system have the following at least two possible implementations.

First Implementation

The second encryption and decryption unit is coupled to the bus converter and is configured to: receive second data that includes the first ciphertext and that is obtained by the bus converter converting the first data including the first ciphertext, encrypt the second data including the first ciphertext based on the second encryption algorithm, and decrypt the second data including the first ciphertext based on a first decryption algorithm, to obtain second data including a second ciphertext, and transmit the second data including the second ciphertext on the second bus.

The third encryption and decryption unit is coupled to the second signal processing module and is configured to: receive the second data including the second ciphertext from the second bus, and decrypt the second data including the second ciphertext based on a second decryption algorithm, to obtain second data that includes the first plaintext and that is required by the second signal processing module.

The first decryption algorithm matches the first encryption algorithm, and the second decryption algorithm matches the second encryption algorithm. If an encryption algorithm matches a decryption algorithm, data encrypted by using the encryption algorithm can be decrypted by using the corresponding decryption algorithm.

Second Implementation

The second encryption and decryption unit is coupled to the bus converter and is configured to: receive second data that includes the first ciphertext and that is obtained by the bus converter converting the first data including the first ciphertext, encrypt the second data including the first ciphertext based on the second encryption algorithm, to obtain second data including a third ciphertext, and transmit the second data including the third ciphertext on the second bus.

The third encryption and decryption unit is coupled to the second signal processing module and is configured to: receive the second data including the third ciphertext from the second bus, and decrypt the second data including the third ciphertext based on a first decryption algorithm and a second decryption algorithm, to obtain second data that includes the first plaintext and that is required by the second signal processing module.

The first decryption algorithm matches the first encryption algorithm, and the second decryption algorithm matches the second encryption algorithm.

In some embodiments, for the foregoing two possible implementations, before the second signal processing module receives the second data that includes the first plaintext and that is decrypted by the third encryption and decryption unit, the third encryption and decryption unit receives a decryption control instruction sent by the preset hardware or the preset software. The decryption control instruction is used to instruct the third encryption and decryption unit to decrypt the second data including the second ciphertext or the third ciphertext into the second data including the first plaintext and to send the second data including the first plaintext to the second signal processing unit.

In addition, before the third encryption and decryption unit decrypts the second data including the second ciphertext or the third ciphertext, the third encryption and decryption unit performs integrity check on the second data including the second ciphertext or the third ciphertext, and decrypts, if determining that the integrity check performed on the second data including the second ciphertext or the third ciphertext succeeds, the second data including the second ciphertext or the third ciphertext.

In some embodiments, the second implementation is used as an example. The first signal processing module sends the first plaintext to the second signal processing module. The first encryption and decryption unit uses the first encryption algorithm to encrypt the first data including the first plaintext to obtain the first data including the first ciphertext, and uses the first ciphertext to calculate first check data. Then, the bus converter converts the first data including the first ciphertext into the second data including the first ciphertext, and the second encryption and decryption unit encrypts the second data including the first ciphertext based on the second encryption algorithm, to obtain the second data including the third ciphertext, and uses the third ciphertext to calculate second check data. When receiving the second data including the third ciphertext, the third encryption and decryption unit performs, by using the first check data and the second check data, integrity check on the second data including the third ciphertext. If the integrity check succeeds, the third encryption and decryption unit continues to decrypt the second data including the third ciphertext. If the integrity check fails, the third encryption and decryption unit performs alarming, and the bus encryption system is reset.

It should be noted that the above-mentioned first encryption and decryption system and second encryption and decryption system are systems configured to encrypt and decrypt data transmitted on a bus. Therefore, such systems are directly coupled to corresponding buses and are responsible for security of data transmitted on the buses. Various different encryption and decryption technologies may exist in an electronic system. However, a conventional encryption and decryption technology is mostly responsible for a particular service, that is, used to encrypt a particular type of service data (encryption and decryption at a service layer). For example, a type of data generated by a CPU or a digital signal processor (DSP), such as identity authentication information, usually needs to be encrypted. In addition, such systems may not be responsible for a particular type of service or data, but directly responsible for the buses, and encrypt or decrypt multiple types of data or multiple types of service data transmitted on the corresponding buses. Therefore, to-be-encrypted or to-be-decrypted data may already be ciphertext data, that is, data that is already encrypted or decrypted at the service layer.

For example, a signal processing module A on the AHB needs to send a first plaintext to a signal processing module B on the APB. A first encryption and decryption unit in a first encryption and decryption system corresponding to the AHB is coupled to the signal processing module A, encrypts, by using the first encryption algorithm and upon receiving first data that includes the first plaintext and that is sent by the signal processing module A to the signal processing module B, the first data including the first plaintext, to obtain first data including a first ciphertext, and sends, to the bus converter by using the AHB, the first data including the first ciphertext.

In some embodiments, the first encryption algorithm may be a simplified Advanced Encryption Standard (AES) encryption algorithm.

The bus converter converts the first data including the first ciphertext into second data including the first ciphertext.

For the first implementation, a second encryption and decryption unit in a second encryption and decryption system corresponding to the APB is coupled to the bus converter. After receiving the second data that includes the first ciphertext and that is converted by the bus converter, the second encryption and decryption unit encrypts the second data including the first ciphertext based on the second encryption algorithm, and decrypts the second data including the first ciphertext based on the first decryption algorithm, to obtain second data including a second ciphertext, and transmits the second data including the second ciphertext on the APB.

Herein, a manner of first encryption and then decryption is to avoid exposure of the plaintext, so as to ensure that transmitted data is more secure. In some embodiments, the first decryption algorithm may correspondingly be a simplified AES decryption algorithm, that is, iterative operations of the AES algorithm are performed for three rounds. A specific quantity of rounds may be comprehensively estimated and determined according to security and performance requirements. In some embodiments, the second encryption algorithm may be the permutation of a Data Encryption Standard (DES) algorithm.

| Permutation table |
| --- |
| 58, 50, 42, 34, 26, 18, 10, 2, |
| 60, 52, 44, 36, 28, 20, 12, 4, |
| 62, 54, 46, 38, 30, 22, 14, 6, |
| 64, 56, 48, 40, 32, 24, 16, 8, |
| 57, 49, 41, 33, 25, 17, 9, 1, |
| 59, 51, 43, 35, 27, 19, 11, 3, |
| 61, 53, 45, 37, 29, 21, 13, 5, |
| 63, 55, 47, 39, 31, 23, 15, 7 |

A third encryption and decryption unit in the second encryption and decryption system is coupled to the signal processing module B and is configured to: receive, from the APB, the second data including the second ciphertext, decrypt the second data including the second ciphertext based on the second decryption algorithm, to obtain second data including the first plaintext, and forward the second data including the first plaintext to the signal processing module B.

The entire process in which the signal processing module A on the AHB sends the first plaintext to the signal processing module B on the APB is completed.

In some embodiments, the second decryption algorithm is corresponding to reverse permutation of the DES algorithm.

| Reverse permutation table |
| --- |
| 40, 8, 48, 16, 56, 24, 64, 32, |
| 39, 7, 47, 15, 55, 23, 63, 31, |
| 38, 6, 46, 14, 54, 22, 62, 30, |
| 37, 5, 45, 13, 53, 21, 61, 29, |
| 36, 4, 44, 12, 52, 20, 60, 28, |
| 35, 3, 43, 11, 51, 19, 59, 27, |
| 34, 2, 42, 10, 50, 18, 58, 26, |
| 33, 1, 41, 9, 49, 17, 57, 25 |

If a security level of a module on the AHB is higher, complexity and a cracking difficulty of a first cryptographic algorithm set including the first encryption algorithm and the first decryption algorithm is higher than complexity and a cracking difficulty of a second cryptographic algorithm set including the second encryption algorithm and the second decryption algorithm.

For another example, the first cryptographic algorithm set may use a symmetric encryption and decryption algorithm, a simplified symmetric encryption and decryption algorithm, a combination of various simplified encryption and decryption algorithms, or another encryption and decryption manner with high complexity and a high speed, and the second cryptographic algorithm may use a much simpler encryption and decryption solution, such as one or more times of permutation, or data stream obfuscation.

For the second implementation, a second encryption and decryption unit in a second encryption and decryption system corresponding to the APB is coupled to the bus converter, encrypts the second data including the first ciphertext based on the second encryption algorithm after receiving the second data that includes the first ciphertext and that is converted by the bus converter, to obtain second data including a third ciphertext, and transmits the second data including the third ciphertext on the APB.

A third encryption and decryption unit in the second encryption and decryption system is coupled to the signal processing module B and is configured to: receive, from the APB, the second data including the third ciphertext, decrypt the second data including the third ciphertext based on the first decryption algorithm and the second decryption algorithm, to obtain second data including the first plaintext, and forward the second data including the first plaintext to the signal processing module B.

The entire process in which the signal processing module A on the AHB sends the first plaintext to the signal processing module B on the APB is completed.

It should be noted that the foregoing hierarchical bus encryption system includes two buses: AHB+APB. If the hierarchical bus encryption system includes three buses: AHB+APB1+APB2, when a signal processing module 1 on the AHB sends a plaintext A to a signal processing module 2 on the APB2, a first encryption and decryption system corresponding to the AHB needs to perform encryption based on the first encryption algorithm, a second encryption and decryption system corresponding to the APB1 needs to perform encryption based on the second encryption algorithm and perform decryption based on the first decryption algorithm, and a third encryption and decryption system corresponding to the APB2 needs to perform encryption based on a third encryption algorithm and perform decryption based on the second decryption algorithm. Before the signal processing module 2 receives the plaintext A, the third encryption and decryption system performs decryption based on a third decryption algorithm, to obtain third data including the plaintext A. Alternatively, a first encryption and decryption system corresponding to the AHB needs to perform encryption based on the first encryption algorithm, a second encryption and decryption system corresponding to the APB1 needs to perform encryption based on the second encryption algorithm, and a third encryption and decryption system corresponding to the APB2 needs to perform encryption based on a third encryption algorithm. Before the signal processing module 2 receives the plaintext A, the third encryption and decryption system performs decryption based on the first decryption algorithm, the second decryption algorithm, and a third decryption algorithm, to obtain third data including the plaintext A.

Therefore, when an encryption and decryption unit coupled to a target signal processing module decrypts data including a ciphertext, a total quantity of times of encryption and decryption that are already performed from a source signal processing module to the target signal processing module needs to be determined, so as to determine a quantity of times of decryption that needs to be performed, and obtain accurate decrypted data.

In some embodiments, a series of flag bits are selected and added to the transmitted data, that is, each encryption and decryption unit adds, after encrypting data, a flag bit corresponding to the encryption and decryption unit. For example, the first encryption and decryption unit adds a first flag bit to the first data that includes the first ciphertext and that is obtained by encrypting the first data including the first plaintext, and the second encryption and decryption unit correspondingly adds a second flag bit or a third flag bit to the second data that includes the second ciphertext or the third ciphertext and that is obtained by encrypting the second data including the first ciphertext. In this way, the third encryption and decryption unit obtains, by means of analysis, the flag bits in the data, so as to determine a quantity of decryption times and a decryption algorithm that needs to be used.

The bus converter is configured to serve as an interface between the first data and the second data, to adapt to the first bus and the second bus. Specifically, the first data transmitted on the first bus is converted by the bus converter into the second data adapting to the second bus, and continues to be transmitted on the second bus. Alternatively, the bus converter may be configured to isolate the first bus and the second bus, to implement security.

The bus converter is an interface used for connecting different adjacent buses. For example, when data is transferred between different buses, data cache or synchronization needs to be performed. The bus converter may implement an interface function of data cache or synchronization. For example, two buses may have different data transmission rates, that is, transmission bandwidth may be different, or the two buses conform to different time sequences and protocols. The bus converter may serve as an interface of two adjacent buses, to convert the first data corresponding to the first bus into the second data corresponding to the second bus, so as to implement data adaptation. It should be noted that even though the two buses are buses of a same type, the bus converter may also be used as an interface between the two same-type buses (for example, AHBs or APBs), so as to implement data isolation between the two buses and to ensure that data on the two buses has different security levels.

In addition, the bus converter may further perform some functions of an encryption and decryption system, is equivalent to the second encryption and decryption unit in the foregoing second encryption and decryption system, and may also include at least two implementations:

First Implementation

The bus converter includes an encryption and decryption conversion unit, configured to: obtain second data including the first ciphertext by converting the first data including the first ciphertext, encrypt the second data including the first ciphertext based on the second encryption algorithm, and decrypt the second data including the first ciphertext based on a first decryption algorithm, to obtain second data including a second ciphertext, and transmit the second data including the second ciphertext on the second bus. In this implementation, the encryption and decryption conversion unit may first perform encryption based on the second encryption algorithm and then perform decryption based on the first decryption algorithm. This can avoid exposure of data in a plaintext form and improve security.

In this case, the second encryption and decryption system includes:

a third encryption and decryption unit, coupled to the second signal processing module, and configured to: receive the second data including the second ciphertext from the second bus, and decrypt the second data including the second ciphertext based on a second decryption algorithm, to obtain second data that includes the first plaintext and that is required by the second signal processing module.

The first decryption algorithm matches the first encryption algorithm, and the second decryption algorithm matches the second encryption algorithm.

Second Implementation

The bus converter includes an encryption and decryption conversion unit, configured to: obtain second data including the first ciphertext by converting the first data including the first ciphertext, encrypt the second data including the first ciphertext based on the second encryption algorithm, to obtain second data including a third ciphertext, and transmit the second data including the third ciphertext on the second bus.

In this case, the second encryption and decryption system includes:

a third encryption and decryption unit, coupled to the second signal processing module, and configured to: receive the second data including the third ciphertext from the second bus, and decrypt the second data including the third ciphertext based on a first decryption algorithm and a second decryption algorithm, to obtain second data that includes the first plaintext and that is required by the second signal processing module.

The first decryption algorithm matches the first encryption algorithm, and the second decryption algorithm matches the second encryption algorithm.

For example, a signal processing module A on the AHB needs to send a first plaintext to a signal processing module B on the APB. A first encryption and decryption unit in a first encryption and decryption system corresponding to the AHB is coupled to the signal processing module A, encrypts, by using the first encryption algorithm and upon receiving first data that includes the first plaintext and that is sent by the signal processing module A to the signal processing module B, the first data including the first plaintext, to obtain first data including a first ciphertext, and sends the first data including the first ciphertext to the bus converter through the AHB.

For the first implementation, the bus converter converts the first data including the first ciphertext into second data including the first ciphertext, encrypts the second data including the first ciphertext based on the second encryption algorithm, and decrypts the second data including the first ciphertext based on the first decryption algorithm, to obtain second data including a second ciphertext, and transmits the second data including the second ciphertext on the APB.

A third encryption and decryption unit in the second encryption and decryption system is coupled to the signal processing module B and is configured to: receive, from the APB, the second data including the second ciphertext, decrypt the second data including the second ciphertext based on the second decryption algorithm, to obtain second data including the first plaintext, and forward the second data including the first plaintext to the signal processing module B.

The entire process in which the signal processing module A on the AHB sends the first plaintext to the signal processing module B on the APB is completed.

For the second implementation, the bus converter converts the first data including the first ciphertext into second data including the first ciphertext, encrypts the second data including the first ciphertext based on the second encryption algorithm, to obtain second data including a third ciphertext, and transmits the second data including the third ciphertext on the APB.

A third encryption and decryption unit in the second encryption and decryption system is coupled to the signal processing module B and is configured to: receive, from the APB, the second data including the third ciphertext, decrypt the second data including the third ciphertext based on the first decryption algorithm and the second decryption algorithm, to obtain second data including the first plaintext, and forward the second data including the first plaintext to the signal processing module B.

The entire process in which the signal processing module A on the AHB sends the first plaintext to the signal processing module B on the APB is completed.

Certainly, the bus converter may also be an interface of only one bus, and does not include the encryption and decryption conversion unit. That is, all encryption and decryption functions are implemented outside the bus. In this case, an external encryption and decryption unit is coupled to the bus converter. An implemented function is similar to that of a built-in encryption and decryption conversion unit.

In the first implementation, an encryption and decryption process is sequentially encryption by using an algorithm 1, encryption by using an algorithm 2, decrypting by using the algorithm 1, transmission by using a bus 2, and decryption by using the algorithm 2.

A difference between the second implementation and the first implementation is as follows: Data is decrypted based on the first decryption algorithm before being transferred on the second bus, or is decrypted by the third encryption and decryption unit based on the first decryption algorithm after being transferred to a target unit, for example, the third encryption and decryption unit. That is, in the second implementation, the third encryption and decryption unit performs decryption twice. In the second implementation, an encryption and decryption process is sequentially encryption by using an algorithm 1, encryption by using an algorithm 2, transmission by using a bus 2, decryption by using the algorithm 1, and decryption by using the algorithm 2. A sequence of two times of decryption (decryption by using the algorithm 1 and decryption by using the algorithm 2) performed by the third encryption and decryption unit is not limited in this embodiment.

In addition, the hierarchical bus encryption system further includes at least one random number generator, configured to generate at least one key of a cryptographic algorithm set of encryption or decryption used by each encryption and decryption unit and each encryption and decryption conversion unit.

Figure 4:
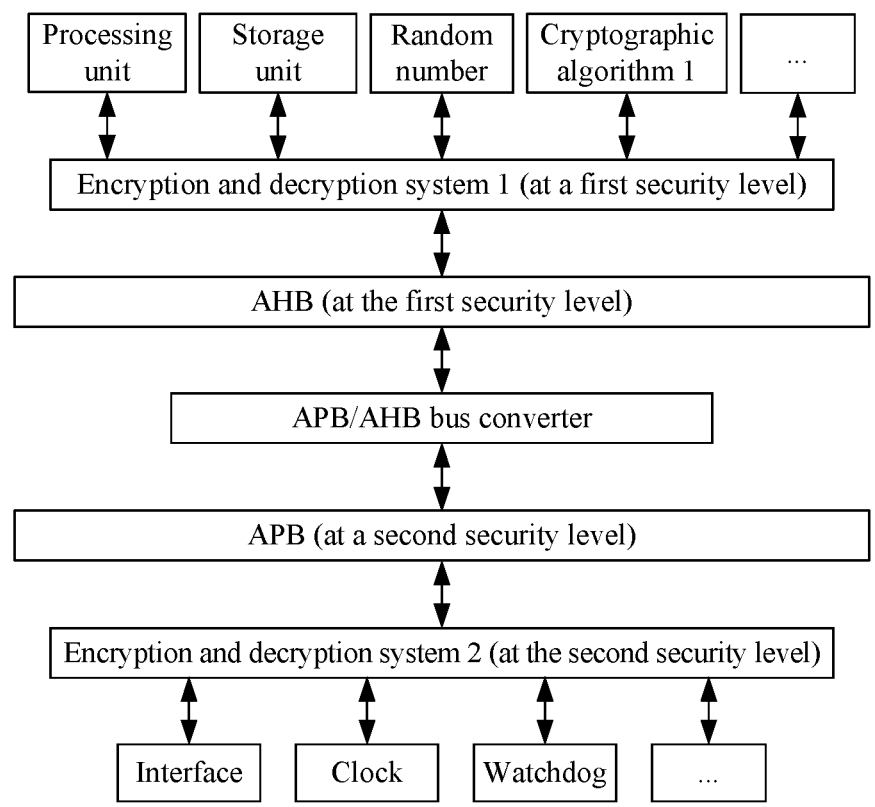
FIG. 4 is a specific schematic structural diagram 1 of a hierarchical bus encryption system according to an embodiment of the present invention.

Referring to FIG. 4, it should be noted that the random number generator is a signal processing module. Each bus may be corresponding to one random number generator, or one bus encryption system has only one random number generator. Generally, one bus encryption system has one random number generator. The random number generator is a module at a high security level and is coupled to a bus at a high security level.

Specifically, the random number generator may be a true random number generator or a pseudo random number generator. In some embodiments, the true random number generator can generate a key, and critical information such as the key needs to be stored in a secure address, which cannot be accessed, modified, or deleted by any module, of a memory (not shown in the figure).

In addition, the first signal processing module herein can not only perform data communication with the second signal processing module corresponding to the second bus, but also perform data communication with another signal processing module on the first bus.

Further, the first encryption and decryption system further includes a fourth encryption and decryption unit.

The first encryption and decryption unit is further configured to: when receiving first data that includes a second plaintext and that is sent by the first signal processing module to a third signal processing module corresponding to the first bus, encrypt the first data including the second plaintext based on the first encryption algorithm, to obtain first data including a fourth ciphertext, and forward the first data including the fourth ciphertext to the fourth encryption and decryption unit through the first bus.

The fourth encryption and decryption unit is configured to decrypt the first data including the fourth ciphertext based on the first decryption algorithm, to obtain the first data that includes the second plaintext and that is required by the third signal processing module.

The first decryption algorithm matches the first encryption algorithm.

For example, a signal processing module A on the AHB needs to send a second plaintext to a signal processing module C on the AHB. A first encryption and decryption unit in a first encryption and decryption system corresponding to the AHB is coupled to the signal processing module A, encrypts, by using the first encryption algorithm and upon receiving first data that includes the second plaintext and that is sent by the signal processing module A to the signal processing module C, the first data including the second plaintext, to obtain first data including a fourth ciphertext, and sends the first data including the fourth ciphertext to a fourth encryption and decryption unit corresponding to the AHB through the AHB.

The fourth encryption and decryption unit is coupled to the signal processing module C, decrypts the first data including the fourth ciphertext based on the first decryption algorithm upon receiving the first data including the fourth ciphertext, to obtain the first data including the second plaintext, and forwards the first data including the second plaintext to the signal processing module C.

The entire process in which the signal processing module A on the AHB sends the second plaintext to the signal processing module C on the AHB is completed. The following uses three embodiments for brief description.

Embodiment 1

Referring to FIG. 4, two signal processing modules, a storage unit and a cryptographic algorithm 1 unit, are modules at a first security level and are corresponding to an encryption and decryption system at the first security level (an encryption and decryption system 1) and a bus at the first security level (an AHB).

A process of storing back, in the storage unit, data that is in the storage unit and that is encrypted by the cryptographic algorithm 1 unit includes the following:

An encryption and decryption unit 1 in the encryption and decryption system 1 is coupled to the storage unit, encrypts first data that is in the storage unit and that includes a plaintext 1 based on an encryption algorithm 1, to obtain first data including a ciphertext 1, and transmits the first data including the ciphertext 1 to an encryption and decryption unit 2 in the encryption and decryption system 1 through the AHB.

The encryption and decryption unit 2 is coupled to the cryptographic algorithm 1 unit, decrypts the first data including the ciphertext 1 based on a decryption algorithm 1, to obtain the first data including the plaintext 1, and forwards the first data including the plaintext 1 to the cryptographic algorithm 1 unit.

After receiving the first data including the plaintext 1, the cryptographic algorithm 1 unit encrypts the plaintext 1 by using a preset encryption algorithm stored in the cryptographic algorithm 1 unit, to obtain a ciphertext 2, and forwards the ciphertext 2 to the encryption and decryption unit 2.

The encryption and decryption unit 2 encrypts the first data including the ciphertext 2 based on the encryption algorithm 1, to obtain first data including a ciphertext 3, and transmits the first data including the ciphertext 3 to the encryption and decryption unit 1 through the AHB.

The encryption and decryption unit 1 decrypts the first data including the ciphertext 3 based on the decryption algorithm 1, to obtain the first data including the ciphertext 2, and forwards the first data including the ciphertext 2 to the storage unit.

The storage unit stores the ciphertext 2 in the first data.

Embodiment 2

Referring to FIG. 4, a storage unit is a module at a first security level and is separately corresponding to an encryption and decryption system at the first security level (an encryption and decryption system 1) and a bus at the first security level (an AHB). An interface is a module at a second security level and is separately corresponding to an encryption and decryption system at the second security level (an encryption and decryption system 2) and a bus at the second security level (an APB).

A process of sending data in the storage unit by using an interface unit includes the following:

An encryption and decryption unit 1 in the encryption and decryption system 1 is coupled to the storage unit, encrypts first data that is in the storage unit and that includes a plaintext 2 based on an encryption algorithm 1, to obtain first data including a ciphertext 4, and transmits the first data including the ciphertext 4 to a bus converter through the AHB.

The APB/AHB converter converts the first data including the ciphertext 4 into second data including the ciphertext 4, and forwards the second data including the ciphertext 4 to an encryption and decryption unit 3 in the encryption and decryption system 2. The APB/AHB converter is configured to convert APB bus data into AHB data, to implement data adaptation between the APB bus and the AHB.

The encryption and decryption unit 3 encrypts the second data including the ciphertext 4 based on an encryption algorithm 2, to obtain second data including a ciphertext 5, and forwards the second data including the ciphertext 5 to an encryption and decryption unit 4 through a second bus.

The encryption and decryption unit 4 is coupled to the interface unit, decrypts the second data including the ciphertext 5 based on a decryption algorithm 1 and a decryption algorithm 2, to obtain second data including the plaintext 2, and forwards the second data including the plaintext 2 to the interface unit.

After receiving the second data including the plaintext 2, the interface unit sends the second data including the plaintext 2 to outside of the system.

Embodiment 3

Figure 5:
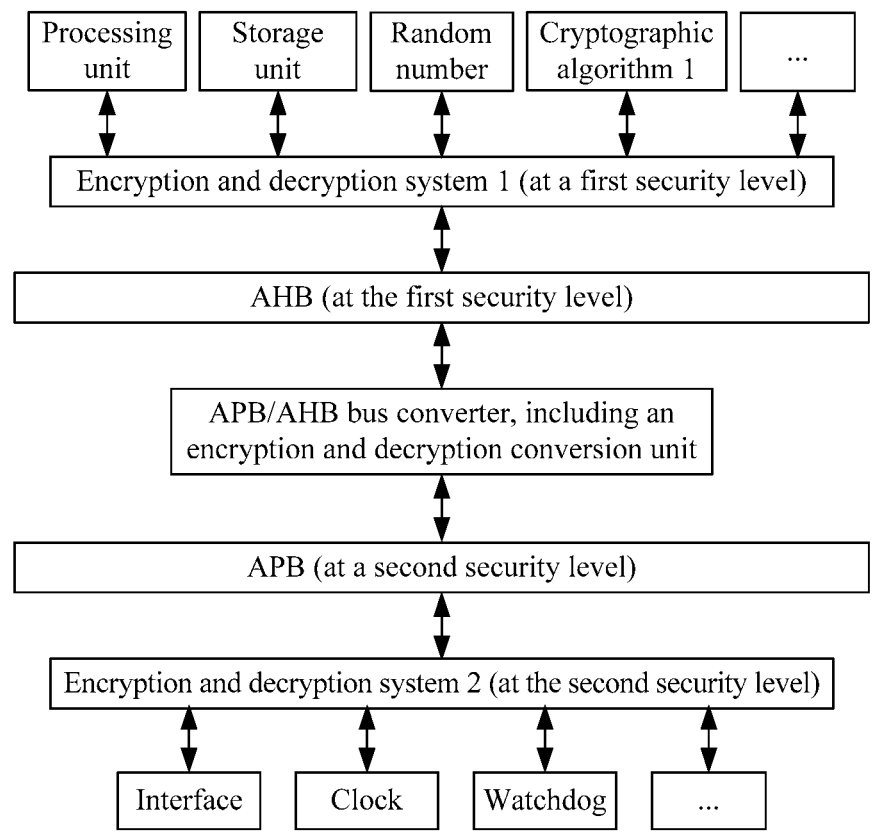
FIG. 5 is a specific schematic structural diagram 2 of a hierarchical bus encryption system according to an embodiment of the present invention.

Referring to FIG. 5, a storage unit is a module at a first security level and is separately corresponding to an encryption and decryption system at the first security level (an encryption and decryption system 1) and a bus at the first security level (an AHB). An interface unit is a module at a second security level and is separately corresponding to an encryption and decryption system at the second security level (an encryption and decryption system 2) and a bus at the second security level (an APB). An APB/AHB converter includes an encryption and decryption conversion unit.

A process of sending data in the storage unit by using the interface unit includes the following:

An encryption and decryption unit 1 in the encryption and decryption system 1 is coupled to the storage unit, encrypts first data that is in the storage unit and that includes a plaintext 2 based on an encryption algorithm 1, to obtain first data including a ciphertext 4, and transmits the first data including the ciphertext 4 to the bus converter through the AHB.

The APB/AHB converter converts the first data including the ciphertext 4 into second data including the ciphertext 4, encrypts the second data including the ciphertext 4 based on an encryption algorithm 2, to obtain second data including a ciphertext 5, and decrypts the second data including the ciphertext 5 based on a decryption algorithm 1, to obtain second data including a ciphertext 6.

An encryption and decryption unit 4 is coupled to the interface unit, decrypts the second data including the ciphertext 6 based on a decryption algorithm 2, to obtain second data including the plaintext 2, and forwards the second data including the plaintext 2 to the interface unit.

After receiving the second data including the plaintext 2, the interface unit sends the second data including the plaintext 2 to outside of a system.

An encryption and decryption unit 1 in the encryption and decryption system 1 is coupled to the storage unit, encrypts first data that is in the storage unit and that includes a plaintext 2 based on an encryption algorithm 1, to obtain first data including a ciphertext 4, and transmits the first data including the ciphertext 4 to the bus converter through the AHB.

The APB/AHB converter converts the first data including the ciphertext 4 into second data including the ciphertext 4, and forwards the second data including the ciphertext 4 to an encryption and decryption unit 3 in the encryption and decryption system 2. The APB/AHB converter is configured to convert APB bus data into AHB data, to implement data adaptation between the APB bus and the AHB.

The encryption and decryption unit 3 encrypts the second data including the ciphertext 4 based on a second encryption algorithm, to obtain second data including a ciphertext 5, and forwards the second data including the ciphertext 5 to an encryption and decryption unit 4 through a second bus.

The encryption and decryption unit 4 is coupled to the interface unit, decrypts the second data including the ciphertext 5 based on a decryption algorithm 1 and a decryption algorithm 2, to obtain second data including the plaintext 2, and forwards the second data including the plaintext 2 to the interface unit.

After receiving the second data including the plaintext 2, the interface unit sends the second data including the plaintext 2 to outside of a system.

In conclusion, the solutions mentioned in the embodiments of the present invention may be applied to an eSE chip such as a mobile payment chip and a financial IC card chip. An eSE may be integrated in another functional circuit chip or used as an independent chip. Security of an eSE function is usually higher than that of a function of another insecure service, for example, a common voice or data communication processing or application (APP) software service.

According to the system provided in the embodiments of the present invention, an anti-attack capability of the system can be improved. Because data transmitted on a bus is encrypted data, even though an attacker obtains bus data by means of a probe attack, it is quite difficult to break a key. Further, a module at a high security level is corresponding to a high-level encryption and decryption unit, and algorithm complexity is higher. Therefore, security of transmitted data is further ensured. In addition, each system is corresponding to a unique key. This increases a difficulty in cracking a chip.

In addition, layout and cabling of a two-level or multi-level bus and a corresponding module and encryption and decryption unit are distributed in a circuit layout. A high-level module circuit hides in a large-scale complex circuit, and a circuit with a corresponding function is difficult to detect and find by using a physical means. Therefore, security is higher.

Therefore, if the corresponding technology is applied to the eSE field, security and performance can be ensured. Specific encryption is performed for each module that needs to transmit data on a bus, thereby ensuring high security of some modules, and ensuring high speeds of some modules. The modules are separately attached to buses at different levels according to security. This physically isolates secure data from common data, and further improves security of the secure data. A system bus with an appropriately designed bus level is fully and efficiently used. The improved hierarchical secure bus design effectively improves processing efficiency of the system, and subsequent system maintenance becomes much simpler. Certainly, the embodiments are not limited to being applied to the eSE field. However, the eSE field is a preferred application field.

The units or modules in the embodiments of the present invention may be modules including an electronic device (for example, a transistor), such as a processor or an integrated circuit. Some modules may implement related functions by using an electronic device to execute software driver code. For example, the cryptographic algorithm module 1 mentioned in the foregoing embodiments may be a processor executing a cryptographic algorithm and implement a cryptographic algorithm function by executing software driver code related to the cryptographic algorithm. Therefore, the embodiments of the present invention may provide a method, a system, or a computer program product. Therefore, the system in the embodiments of the present invention may use a form of a hardware-only embodiment, or an embodiment combining software and hardware. Moreover, some related functions of some modules in the present invention may use a form of a computer program product that is implemented on one or more computer-available storage mediums (including but not limited to a magnetic disk memory, a CD-ROM, an optical memory, and the like) including computer-available program code.

Although some preferred embodiments of the present invention have been described, persons skilled in the art can make changes and modifications to these embodiments once they learn the basic inventive concept. Therefore, the following claims are intended to be construed as to cover embodiments in accordance with the disclosure, including those with changes and modifications falling within the scope of the present invention, although not expressly described herein.

"Coupling" mentioned in the embodiments includes a direct connection by means of a wire or a direct connection by means of another module, unit, or device. It should be understood, in a broad sense, that coupling is used to implement signal exchange between different modules in a particular form and should not be construed as merely including a direct connection.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

The invention claimed is:

1. A hierarchical bus encryption system, comprising: at least two buses comprising a first bus and a second bus, an encryption and decryption system corresponding to each bus, at least one signal processing module corresponding to each bus, and a bus converter coupled between the first bus and the second bus, wherein
the at least one signal processing module includes a first signal processing module corresponding to the first bus, the first signal processing module being configured to perform data communication with a second signal processing module corresponding to the second bus through the first bus, the bus converter, and the second bus;
the encryption and decryption system corresponding to the first bus is the first encryption and decryption system and is configured to perform encryption processing on first data transmitted on the first bus based on a first encryption algorithm;
the encryption and decryption system corresponding to the second bus is the second encryption and decryption system and is configured to perform encryption processing on second data transmitted on the second bus based on a second encryption algorithm;
the bus converter is configured to serve as an interface between the first data and the second data, to adapt to the first bus and the second bus;
the first encryption algorithm is corresponding to a first security level, the second encryption algorithm is corresponding to a second security level, and the first security level is different from the second security level; and
the first encryption and decryption system adds a first indicator to the first data transmitted on the first bus and the second encryption and decryption system adds a second indicator to the second data transmitted on the second bus, the first indicator and the second indicator being indicative of a quantity of times the first data or the second data has been encrypted.

2. The system according to claim 1, wherein the first encryption and decryption system comprises:
a first encryption and decryption unit, coupled to the first signal processing module, and configured to: when receiving the first data that comprises a first plaintext and that is sent by the first signal processing module to the second signal processing module:
encrypt the first data comprising the first plaintext based on the first encryption algorithm,
obtain the first data comprising a first ciphertext, and
forward the first data comprising the first ciphertext to the bus converter through the first bus.

3. The system according to claim 2, wherein the second encryption and decryption system comprises:

a second encryption and decryption unit, coupled to the bus converter, and configured to:
receive the second data that comprises the first ciphertext and that is obtained by the bus converter converting the first data comprising the first ciphertext,
encrypt the second data comprising the first ciphertext based on the second encryption algorithm, and
decrypt the second data comprising the first ciphertext based on a first decryption algorithm, to obtain the second data comprising a second ciphertext, and transmit the second data comprising the second ciphertext on the second bus; and
a third encryption and decryption unit, coupled to the second signal processing module, and configured to:
receive the second data comprising the second ciphertext from the second bus, and
decrypt the second data comprising the second ciphertext based on a second decryption algorithm, to obtain the second data that comprises the first plaintext and that is required by the second signal processing module; and, wherein
the first decryption algorithm matches the first encryption algorithm, and the second decryption algorithm matches the second encryption algorithm.

4. The system according to claim 2, wherein the second encryption and decryption system comprises:
a second encryption and decryption unit, coupled to the bus converter, and configured to:
receive the second data that comprises the first ciphertext and that is obtained by the bus converter converting the first data comprising the first ciphertext,
encrypt the second data comprising the first ciphertext based on the second encryption algorithm, to obtain the second data comprising a third ciphertext, and
transmit the second data comprising the third ciphertext on the second bus; and
a third encryption and decryption unit, coupled to the second signal processing module, and configured to:
receive the second data comprising the third ciphertext from the second bus, and
decrypt the second data comprising the third ciphertext based on a first decryption algorithm and a second decryption algorithm, to obtain the second data that comprises the first plaintext and that is required by the second signal processing module; and, wherein
the first decryption algorithm matches the first encryption algorithm, and the second decryption algorithm matches the second encryption algorithm.

5. The system according to claim 2, wherein the bus converter comprises an encryption and decryption conversion unit, configured to:
obtain the second data comprising the first ciphertext by converting the first data comprising the first ciphertext,
encrypt the second data comprising the first ciphertext based on the second encryption algorithm,
decrypt the second data comprising the first ciphertext based on a first decryption algorithm, to obtain the second data comprising a second ciphertext, and
transmit the second data comprising the second ciphertext on the second bus; and, wherein the second encryption and decryption system comprises:
a third encryption and decryption unit, coupled to the second signal processing module, and configured to:
receive the second data comprising the second ciphertext from the second bus, and decrypt the second data comprising the second ciphertext based on a second decryption algorithm, to obtain the second data that comprises the first plaintext and that is required by the second signal processing module; and the first decryption algorithm matches the first encryption algorithm, and the second decryption algorithm matches the second encryption algorithm.

6. The system according to claim 2, wherein the first encryption and decryption system further comprises a fourth encryption and decryption unit;

the first encryption and decryption unit is further configured to:

when receiving the first data that comprises a second plaintext and that is sent by the first signal processing module to the third signal processing module corresponding to the first bus, encrypt the first data comprising the second plaintext based on the first encryption algorithm, to obtain the first data comprising a fourth ciphertext, and forward the first data comprising the fourth ciphertext to the fourth encryption and decryption unit through the first bus; and the fourth encryption and decryption unit is configured to:

decrypt the first data comprising the fourth ciphertext based on a first decryption algorithm, to obtain the first data that comprises the second plaintext and that is required by the third signal processing module, wherein the first decryption algorithm matches the first encryption algorithm.

7. The system according to claim 1, wherein the system further comprises at least one random number generator, configured to generate at least one key of a cryptographic algorithm set of encryption or decryption used by each encryption and decryption system and each encryption and decryption conversion unit.

8. The system according to claim 1, wherein at least one of the first bus or the second bus is at least one bus of a high-performance bus AHB, an advanced peripheral bus APB, or an advanced system bus ASB.

9. The system according to claim 1, wherein the at least one signal processing module corresponding to each bus comprises at least one of: a signal processing unit, a storage unit, a random number generator, a cryptographic algorithm unit, an interface unit, a clock unit, or a watchdog unit.

10. The system according to claim 1, wherein the system is applied to a mobile payment field.

11. A hierarchical bus encryption system, comprising:

a first bus;

a second bus;

a first encryption and decryption system corresponding to the first bus;

a second encryption and decryption system corresponding to the second bus;

a first signal processing module corresponding to the first bus;

a second signal processing module corresponding to the second bus; and a bus converter coupled between the first bus and the second bus, wherein the first signal processing module is configured to perform data communication with the second signal processing module through the first bus, the bus converter, and the second bus, the first encryption and decryption system is configured to perform encryption processing on first data transmitted on the first bus based on a first encryption algorithm, the second encryption and decryption system is configured to perform encryption processing on second data transmitted on the second bus based on a second encryption algorithm, the bus converter is configured to serve as an interface between the first data and the second data, to adapt to the first bus and the second bus, the first encryption algorithm is corresponding to a first security level, the second encryption algorithm is corresponding to a second security level, and the first security level is different from the second security level, the first encryption and decryption system comprises a first encryption and decryption unit, coupled to the first signal processing module, and configured to, when receiving the first data that comprises a first plaintext and that is sent by the first signal processing module to the second signal processing module:

encrypt the first data comprising the first plaintext based on the first encryption algorithm;

obtain the first data comprising a first ciphertext; and forward the first data comprising the first ciphertext to the bus converter through the first bus, the bus converter comprises a second encryption and decryption unit, configured to:

obtain the second data comprising the first ciphertext by converting the first data comprising the first ciphertext;

encrypt the second data comprising the first ciphertext based on the second encryption algorithm;

decrypt the second data comprising the first ciphertext based on a first decryption algorithm, to obtain the second data comprising a second ciphertext; and transmit the second data comprising the second ciphertext on the second bus, and the second encryption and decryption system comprises:

a third encryption and decryption unit, coupled to the second signal processing module, and configured to:

receive the second data comprising the second ciphertext from the second bus; and decrypt the second data comprising the second ciphertext based on a second decryption algorithm, to obtain the second data that comprises the first plaintext and that is required by the second signal processing module.

12. The system according to claim 11, wherein the first encryption and decryption system further comprises a fourth encryption and decryption unit;

the first encryption and decryption unit is further configured to:

when receiving the first data that comprises a second plaintext and that is sent by the first signal processing module to the third signal processing module corresponding to the first bus, encrypt the first data comprising the second plaintext based on the first encryption algorithm, to obtain the first data comprising a fourth ciphertext, and forward the first data comprising the fourth ciphertext to the fourth encryption and decryption unit through the first bus; and the fourth encryption and decryption unit is configured to:

decrypt the first data comprising the fourth ciphertext based on a first decryption algorithm, to obtain the first data that comprises the second plaintext and that is required by the third signal processing module.

13. The system according to claim 12, wherein the first decryption algorithm matches the first encryption algorithm.

14. The system according to claim 11, wherein the system further comprises at least one random number generator, configured to generate at least one key of a cryptographic algorithm set of encryption or decryption used by each encryption and decryption system and each encryption and decryption conversion unit.

15. The system according to claim 11, wherein at least one of the first bus or the second bus is at least one bus of a high-performance bus AHB, an advanced peripheral bus APB, or an advanced system bus ASB.

16. The system according to claim 11, wherein the at least one signal processing module corresponding to each bus comprises at least one of: a signal processing unit, a storage unit, a random number generator, a cryptographic algorithm unit, an interface unit, a clock unit, or a watchdog unit.

17. The system according to claim 11, wherein the system is applied to a mobile payment field.

18. The system according to claim 11, wherein the first decryption algorithm matches the first encryption algorithm.

19. The system according to claim 11, wherein the second decryption algorithm matches the second encryption algorithm.

20. The system according to claim 11, wherein the first bus is a high-performance bus AHB and the second bus is an advanced peripheral bus APB.

* * * * *